Feb. 5, 1929.
A. C. VAN HOUWELING
1,701,023
CONVEYER FOR GRAIN WEIGHERS
Filed Nov. 19, 1923     2 Sheets-Sheet 1
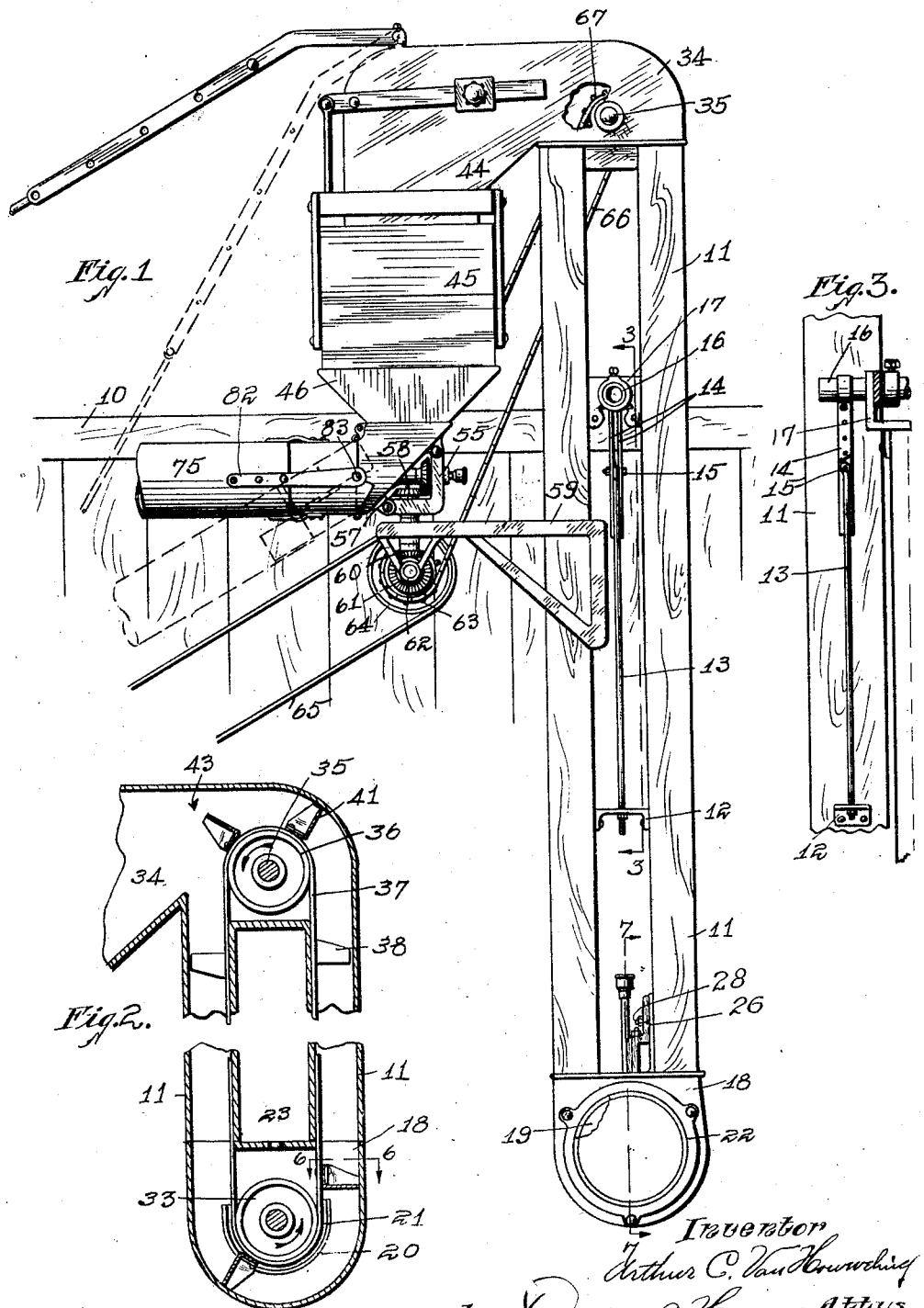

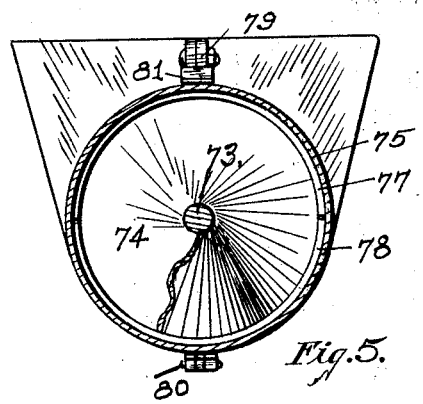
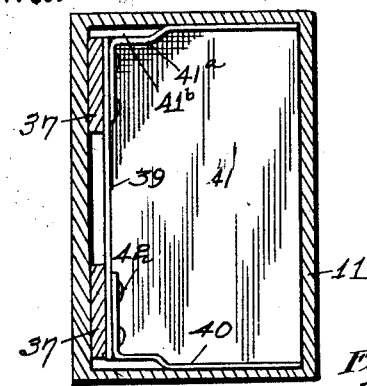
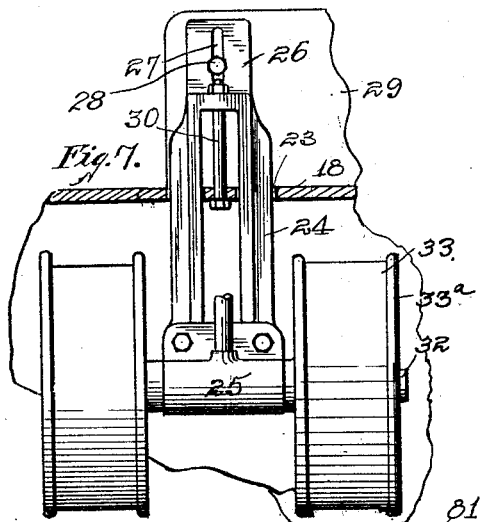
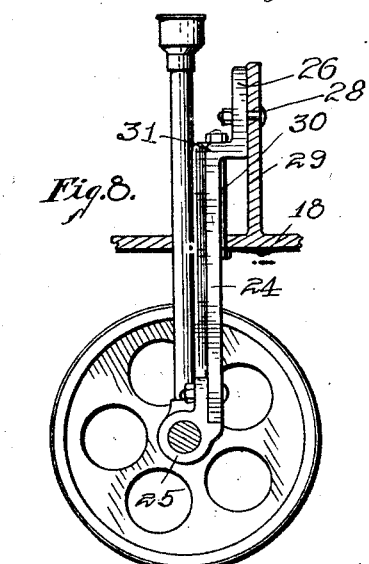
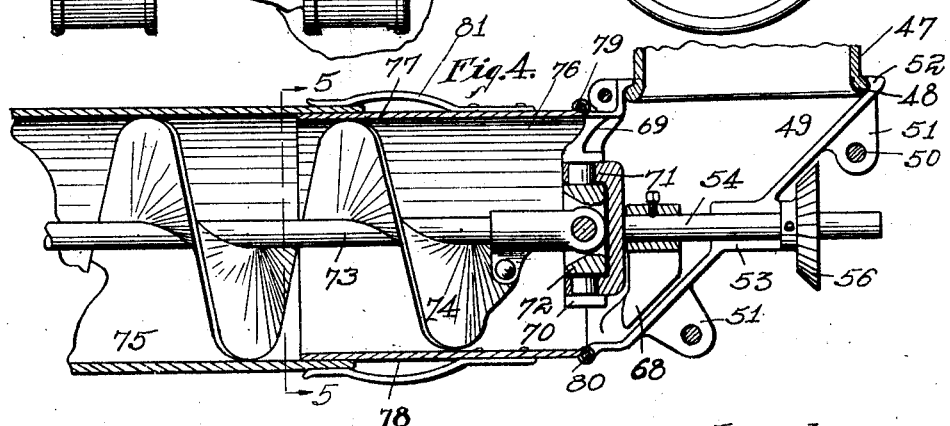

Patented Feb. 5, 1929.

1,701,023

UNITED STATES PATENT OFFICE.

ARTHUR C. VAN HOUWELING, OF PELLA, IOWA, ASSIGNOR, BY MESNE ASSIGNMENTS, TO HART GRAIN WEIGHER COMPANY, OF PEORIA, ILLINOIS, A CORPORATION OF ILLINOIS.

CONVEYER FOR GRAIN WEIGHERS.

Application filed November 19, 1923. Serial No. 675,538.

The object of my invention is to provide a conveying apparatus of simple, durable and inexpensive construction designed to readily, quickly and easily carry grain from a discharge spout of a device, such for instance as a threshing machine, upwardly and into a grain weigher and from the grain weigher to a suitable point of discharge, which may be at various elevations relative to the weigher.

A further object is to provide improved means for elevating the grain from the first mentioned spout to the grain weigher mechanism.

A further object is to provide in a grain elevating and weighing mechanism of the class above described, employing a swinging discharge chute for delivering the grain from the weigher, improved means for connecting the said discharge spout in operative relation with the grain weighing mechanism.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a portion of a threshing machine and a grain weigher and having my improved conveyer applied thereto. The dotted lines in said figure show the delivery spout in a downwardly inclined position.

Figure 2 shows a detail segmental vertical sectional view of the elevating mechanism for conveying the grain from the delivery device of the threshing machine to the grain weigher.

Figure 3 shows a detail view illustrating the means for adjustably supporting the elevator chute relative to threshing machine or the like.

Figure 4 shows a vertical central sectional view of part of the hopper for receiving grain from the weigher and the adjacent end of the discharge spout with its screw conveyer therein.

Figure 5 shows a sectional view on the line 5—5 of Figure 4.

Figure 6 shows an enlarged detail sectional view taken on the line 6—6 of Figure 2.

Figure 7 shows an enlarged sectional view taken on the line 7—7 of Figure 1; and Figure 8 shows a side elevation of the same parts illustrated in Figure 7 taken from a position at right angles to that at which Figure 7 is taken.

The numeral 10 indicates the side of a threshing machine to which my improved device is attached. My improved device comprises an elevator having parallel and upright leg members 11 formed hollow and spaced apart. Said leg members are provided with a bracket 12 for securing the two together, which is supported by means of a downwardly extending rod 13. The upper end of the rod 13 is adjustably mounted between two bars 14 by means of a bolt 15. The upper ends of the bars 14 are suspended from a shaft 16, which in turn is supported in a bracket 17, said bracket being secured to the frame of the threshing machine 10.

The lower end of the rod 13 is adjustably secured in the bracket 12 so that the members 11 may be adjusted up and down at the will of the operator. The lower end of the members 11 is provided with a hollow casting 18 having an opening 19 in one side and an opening 20 in the opposite side. The opening 20 is designed to receive the discharge end of a grain chute 21 of the threshing machine, while the opening 19 is provided with a cover plate 22 detachably secured in position.

The upper end of the casting 18 is provided with slots 23 through which a casting 24 extends. The lower end of the casting 24 is provided with a bearing member 25, while its upper end is provided with a flange 26 having a slot 27, said slot being designed to receive a bolt 28 secured in an upwardly extending flange 29 from the plate 18, as clearly shown in Figures 7 and 8. This provides means whereby the bearing 25 may be adjusted upwardly and downwardly. A bolt 30 is provided in the member 18 and extends upwardly through a shoulder 31 of the member 24 to further assist in the adjustment of the bearing 25.

The bearing 25 is provided with a shaft 32, each end of which is provided with a pulley wheel 33. Each of said pulley wheels 33 is provided with a flange 33ª. The said pulley wheels are designed to rest in the chamber of the casting 18, as clearly illustrated in Figure 2.

The upper ends of the members 11 are provided with a hood 34. The said hood has a shaft 35 which is designed to receive a pair of pulley wheels 36 similar to the pulley wheels 33, and in alinement therewith. Each corresponding pair of pulleys 33 and 36 is provided with a belt 37 formed of flexible material such as rubber or leather. The said belts are designed to travel in the legs 11 and to carry a series of buckets 38. Each of the said buckets is formed of a single piece of sheet metal having a back 39, side members 40 and a bottom 41. Portions of the side members 40 are offset inwardly at 41ª and overlap the back 39, and are secured together and to the said belt 37 by means of rivets 42.

By offsetting the portion 41ª I have provided means whereby the front of the bucket may be made to fit the interior of the legs 11, the flange 33ª of the pulley 33 being permitted to enter the spaces 41ᵇ as the bucket passes over the pulleys. This provides means whereby the bucket will carry a greater amount of material, and at the same time more thoroughly clean the bottom of the chamber of the casting 18. The rivets 42 are placed near the top edge of the back 39, as clearly illustrated in Figure 2. This provides means whereby the free edge of the bottom member 41 will be thrown slightly upwardly or forwardly as the bucket travels around the pulleys 36 in a discharge position, having a tendency to hold the grain against being thrown outwardly or radially from the center of the shaft 35 until the bucket has reached the position substantially as shown at 43. This will permit the grain to be thrown to the left in a horizontal plane, as illustrated in Figure 2, rather than upwardly against the top of the hood 34.

When the buckets are in a filling position as they travel over the pulleys 33, the free edge will also be slightly held in advance, giving a sort of scooping action, and as the buckets reach the position where they travel upwardly through one of the legs 11, the bottom of the buckets will be held against sagging, as would be the case if the rivets 42 were placed in the center of the back 39 instead of the upper edge.

The hood 34 is provided with a discharge chute 44 on which is supported a hopper 45 of the weighing mechanism. The weighing mechanism is of the ordinary construction and provided with a discharge hopper 46. The hopper 46 is provided with a tubular portion 47 through which the grain is discharged. The lower edge of the member 47 is provided with an annular flange 48. The hopper 46 is designed to receive the grain from the weighing mechanism as it is delivered therefrom, and to discharge it through the tubular member 47.

Pivotally secured on the flange 48 I have provided a discharge elbow 49 formed of two castings secured together by means of bolts 50 extending through flanges 51, the elbow being provided at its upper end with an inwardly extending annular flange 52 designed to rest on the flange 48. A half boxing 53 is formed in each of the members 49 and designed to receive a horizontally arranged shaft 54. The outer end of the shaft is supported in a bracket 55 secured to the bolts 50 between the flanges 51.

The shaft 54 is provided with a beveled gear 56 rigidly secured thereto and designed to mesh with a beveled gear 57 mounted on a suitable shaft 58 extending through the bracket member 55. The shaft 58 is also mounted in an auxiliary bracket member 59 secured to one of the legs 11. The lower end of the shaft 58 is provided with a beveled gear 60 in mesh with a beveled gear 61 mounted on a shaft 62. The shaft 62 carries a sprocket wheel 63 and a belt wheel 64. The sprocket 63 is driven from the shaft 62, which is in turn rotated by a suitable belt 65 traveling over the wheel 64. The said sprocket 63 is designed to carry a chain 66 mounted on a sprocket 67 mounted on one end of the shaft 35. The chain 66 provides means for operating the conveyer belts 37.

The inner end of the shaft 54 is provided with an agitating blade 68 for the purpose of assisting the grain to be discharged through the elbow 49. The discharge end of the elbow 49 is also circular and lies in a plane at right angles to the flange 52. This end of the elbow is provided with a bracket 69 designed to carry an annular portion 70, the center of which is in alinement with the center of the shaft 54. The inner end of the shaft 54 is also provided with one member 71 of a universal joint, which is rotatively mounted in the annular member 70. The other member 72 of the universal joint is designed to carry the inner end of a conveyer shaft 73 in which is mounted the screw conveyer 74 of the ordinary type, and designed to operate in the tubular discharge pipe 75.

For connecting the inner end of the discharge pipe 75 with the elbow 49 I have provided a short pipe section 76 formed of two semi-cylindrical members 77 and 78. The member 76 is of such diameter that it may be telescopically mounted in the member 75 with the edges of the semi-cylindrical members 77 and 78 adjacent to each other, and in a plane extending horizontally through the center of the shaft 73.

The member 77 is provided with a hinge 79 rigidly mounted on the upper edge of the discharge opening of the elbow 49, while the member 78 is provided with a hinge 80 secured to the lower edge of the discharge end of the said member 49.

To prevent the members 77 and 78 from collapsing inwardly, I have provided leaf springs 81, the inner ends of which are secured to their respective body portions, while the outer ends of said springs rest on the outer face of the inner end of the tube 75.

The inner end of the tubular member 75 is provided with bars 82 which are riveted thereto and provided with inwardly extending ends, each of which is pivotally mounted on a pivot 83. The said pivots 83 are secured to the outer face of the discharge portion of the member 49. The said pivots 83 are mounted in a horizontal plane extending to the center of the shafts 73 and 54. This will permit the free end of the tubular member 75 to swing upwardly and downwardly about the pivots 83 as a center. This up and down movement will cause a telescopic action between the members 77 and 78 and the inner end of the tubular member 75, and will cause the said members 77 and 78 to move relative to each other, as shown in dotted lines in Figure 1, and at the same time provide means for a grain tight connection between the discharge end of the member 49 and the tubular member 75. The bars 82 cover the crack between the adjacent edges of the members 77 and 78, the said members having to be made of such size that when the tubular member 75 is in a horizontal position, the edges of the members 77 and 78 will not engage each other, forming a substantial crack between them. The said edges will approach each other as the free end of the tubular member 75 is swung downwardly.

It will further be seen that the free end of the member 75 may be swung through a horizontal plane by the member 49 swinging about the tubular member 47, thereby providing a limited universal action for the outer end of the tube 75.

Thus it will be seen that I have provided improved means for elevating grain from the discharge chute of a threshing machine to the grain weigher; and further improved means of simple, durable and inexpensive construction for connecting the discharge pipe 75 universally with the discharge hopper 46 of the weigher.

I claim is my invention:

1. In combination, a threshing machine having an automatic weigher and a discharge chute, means for elevating the grain from said discharge chute to said weigher, means for adjusting said elevating means relative to said threshing machine, said weigher being provided with a discharge hopper, a discharge pipe and means for universally connecting one end of said dishcharge pipe with said discharge hopper, a conveyer in said discharge pipe, and means for continuously actuating said conveyer when the said discharge pipe is in any of its positions of movement.

2. In a device of the class described, a discharge hopper, an elbow pivotally mounted to the discharge end of said hopper, a discharge pipe, bars for pivotally connecting one end of said discharge pipe to the discharge end of said elbow, with the inner end of said discharge pipe spaced from the discharge end of said elbow, semi-cylindrical members mounted telescopically in the inner end of said discharge pipe, means for pivoting each of said semi-cylindrical members to said elbow, a conveyer in said discharge pipe, and means for actuating said conveyer.

3. In a device of the class described, a discharge hopper, an elbow pivotally mounted to the discharge end thereof, a discharge pipe, means for pivotally mounting one end of said discharge pipe, a slight distance from the discharge end of said elbow, semi-cylindrical tubular members for connecting the free end of said discharge pipe with the discharge end of said elbow, means for pivoting the inner ends of said semi-cylindrical tubular members to said elbow, and yieldable means for supporting the outer ends of said semi-cylindrical tubular members telescopically within the inner end of said discharge pipe.

4. In a device of the class described, a discharge hopper, an elbow swiveled with the discharge end of said hopper to swing about a vertical axis and provided with a discharge opening, a shaft mounted horizontally in said elbow and centrally within the discharge opening thereof, a universal joint on the inner end of said shaft, an agitator blade for said shaft inside of said universal joint, a discharge pipe, means for pivotally connecting one end of said discharge pipe to said elbow about a horizontal axis, a screw conveyer for said discharge pipe operatively connected with said universal joint, and means for driving said shaft.

5. In a device of the class described, a discharge elbow formed of two pieces so arranged that when secured together the elbow is provided with inlet and outlet openings arranged in planes substantially at right angles to each other, the outlet opening being provided with a centrally arranged annular member to rotatively receive a universal joint, the said elbow being provided with a bearing to receive a horizontal shaft to extend centrally through said annular member, and means for detachably securing the halves of said elbow together.

6. In a device of the class described, a discharge hopper, an elbow swiveled to the discharge end of said hopper to swing about a vertical axis and provided with a discharge opening, a shaft mounted horizontally in said elbow and in alinement with said discharge opening, a universal joint on the inner end of said shaft, a discharge pipe mounted to swing on a horizontal pivot extending through the pivot center of said universal joint, and a screw conveyer for said discharge pipe operatively connected with said universal joint.

7. In a device of the class described, a discharge hopper, an elbow swiveled to the discharge end of said hopper to swing about a vertical axis and provided with a discharge opening, a shaft mounted horizontally in said elbow and in alinement with said discharge opening, a universal joint on the inner end of said shaft, a discharge pipe mounted to swing on a horizontal pivot extending through the pivot center of said universal joint, a screw conveyer for said discharge pipe operatively connected with said universal joint, and means for driving said shaft when the said elbow is in any of its various positions of swinging movement.

8. In a device of the class described, a discharge hopper, an elbow swiveled to the discharge end of said hopper to swing about a vertical axis and provided with a discharge opening, a discharge pipe communicating with the discharge opening of said elbow, means for pivotally connecting said discharge pipe to said elbow, a screw conveyer mounted in said discharge pipe, a shaft rotatively mounted in said elbow, a universal joint for operatively connecting one end of said shaft to one end of said conveyer, the pivot center of said universal joint and said discharge pipe being in common alinement.

9. In a device of the class described, a discharge hopper, an elbow pivotally mounted to the discharge end of said hopper, a discharge pipe, means for pivotally connecting one end of said discharge pipe to the discharge end of said elbow with the inner end of said discharge pipe spaced therefrom, and a pipe section for connecting the end of said discharge pipe with the end of said elbow in such a manner that free pivotal movement of the discharge pipe will be permitted.

10. In a device of the class described, a discharge hopper, an elbow pivotally mounted to the discharge end of said hopper, a discharge pipe, means for pivotally connecting one end of said discharge pipe to the discharge end of said elbow with the inner end of said discharge pipe spaced therefrom, a pipe section for connecting the end of said discharge pipe with the end of said elbow in such a manner that free pivotal movement of said discharge pipe will be permitted, a conveyer for said discharge pipe, and means carried by said elbow for operating said conveyer when in any of its swinging positions of movement.

Des Moines, Iowa, October 30, 1923.

ARTHUR C. VAN HOUWELING.